May 15, 1934.  P. W. HAMMERLE ET AL  1,958,478

HEADLIGHT ATTACHMENT

Filed Dec. 21, 1931

INVENTORS:
Paul W. Hammerle
Louis Mullner
BY David E. Carlsen
ATTORNEY.

Patented May 15, 1934

1,958,478

UNITED STATES PATENT OFFICE 1,958,478

HEADLIGHT ATTACHMENT

Paul W. Hammerle and Louis Mullner, St. Paul, Minn.

Application December 21, 1931, Serial No. 582,207

1 Claim. (Cl. 240—48.6)

Our invention relates to headlight attachments particularly adapted for use in motor vehicle head lamps.

The main object is to provide a simple, highly efficient and inexpensive device, the use of which eliminates glaring light and simultaneously improves the road lighting in advance of a car, the latter being desirable for the driver of the car for efficient driving and the former eliminating the glare of lights hitherto constituting a dangerous condition where automabiles are appoaching and passing each other on streets and highways. Further objects and advantages of our device are hereinafter fully set forth, reference being had to the accompanying drawing, in which,—

Figure 1:
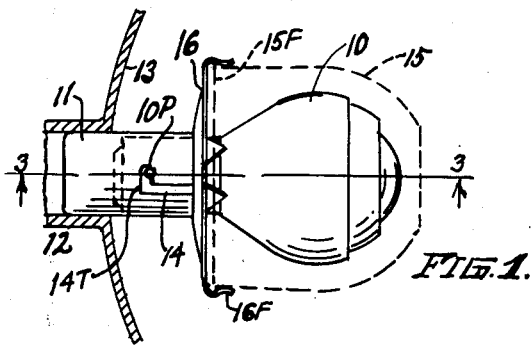
Fig. 1 is a side elevation of our improved headlight attachment in operative position in the lamp socket of a headlamp of a motor vehicle, said socket being shown in full, adjacent headlamp parts dotted, and the glass shield of our device also in dotted lines.
Figure 2:
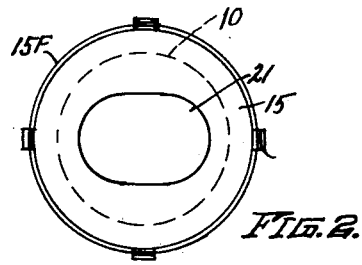
Fig. 2 is a front elevation of Fig. 1.

Referring to the drawing by reference numerals, 10 designates a usual type of automobile headlight bulb and having the integral cylindrical socket stem 10S which is slidably insertable in the fixed cylindrical sleeve 11 of the headlamp 12, the latter suitably fixed in the rear central part of the headlight 13 which is indicated in light lines only in Fig. 1.

The fixed sleeve 11 is provided in its forward part with a pair of diametrically opposite bayonet slots 14, each with the usual inner transverse terminal 14T offset one way and thus providing the pockets for the corresponding fixed pins 10P of the bulb stem. All these parts are common to auto lamp bulb and socket construction but are herein necessarily detailed because of their use in conjunction with our device.

15 is a cup like bulb shield preferably flanged outwardly as 15F at its larger end and its opposite or outer end reduced to form preferably an elongated oval opening 21 which is normally forward of the bulb while the main shield is frictionally but removably retained concentric of and about the bulb 10, as clearly shown in Figs. 1-4 inclusive. The shield is preferably made of so called frosted glass, the "frosted" area of which may be either on its exterior or interior.

The shield 15 is removably retained in the position shown and just described by means of a sheet metal holder 16 of circular form and having at its perimeter a series of forwardly directed fingers 16F of such curvature that the flange 15F of the shield engages them frictionally when the said shield is pressed rearwardly between said fingers and against the face of the holder adjacent said fingers.

Figure 3:
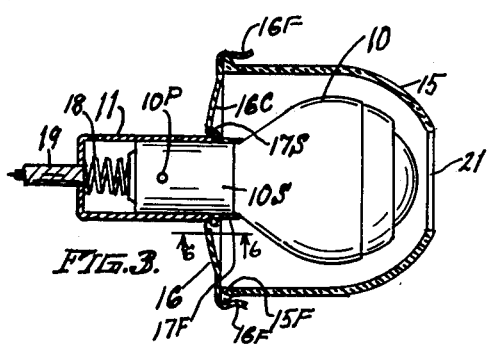
Fig. 3 is a longitudinal sectional elevation about as on line 3—3 in Fig. 1
Figure 4:
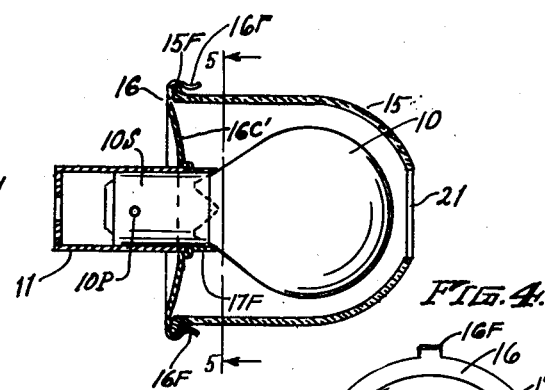
Fig. 4 is a modification of Fig. 3.

The web of the holder interiorly of the fingers may be concave or convex as 16C or 16C' in Figs. 3 and 4 respectively and the area thereof adjacent to the bulb being preferably of shiny finish to provide a light reflecting area.

The central part of the holder has a circular aperture 17 adjacent to which the metal is offset forwardly to provide a circular shoulder stop 17S adapted to bear against the forward end of the fixed lamp socket and of such size that its inner edge does not interfere with free insertion of the bulb stem 10S therethrough and into the fixed socket for fixed contact position (see Fig. 3). Electric contact is made at the inner end of the stem 10S which contacts with spring 18 conducting current from a circuit wire 19.

Figure 6:
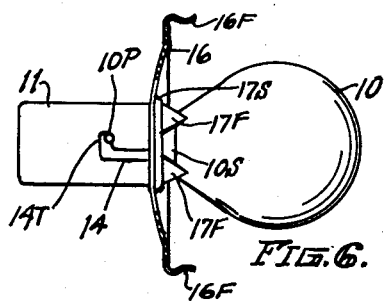
Fig. 6 is a sectional elevation mainly of the lamp shield holder about as on line 6—6 in Fig. 3.

Forward of the shoulder stop 17S, the holder is formed with a circular row of forwardly projecting tapered fingers 17F lightly engaging and being concentrically retained on the front exterior area of the bulb stem 10S (see Fig. 6).

It will now be readily understood that the holder is retained rigidly but removably on the bulb stem in transverse relation thereto and its fingers simultaneously directed forwardly to engage the shield and hold it concentric of and about the bulb 10. Most of the light from the bulb is projected through the "frosted" areas of the shield and when deflected by the regular headlight reflectors 13 is considerably softened or in other words there is no glare. The oval opening 21 of the shield permits direct outlet of clear light therethrough but this light is "mixed" so to speak with the other rays of the non-glaring or softened light projected from the headlight and all light thus projected is non-glaring but very efficient for road illumination. Obviously this result is desirable for night driving and eliminates accidents due to glare.

Figures 7, 8:
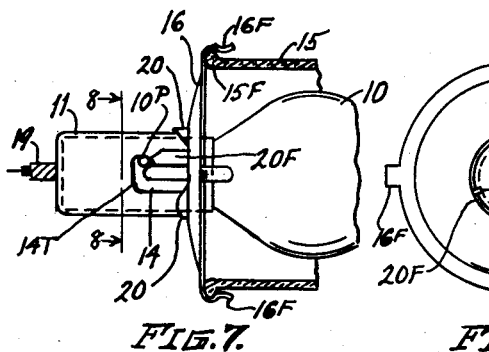
Fig. 7 is a side view corresponding to Fig. 1 but illustrating a modified form of lamp shield holder and Fig. 8 is a rear elevation of the said holder about as on line 8—8 in Fig. 7.
Figure 5:
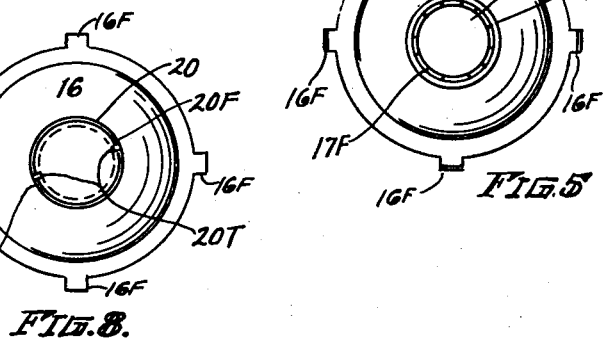
Fig. 5 is a front elevation of the shield holder shown in Fig. 4 looking toward it as from line 5—5 in said Fig. 4.

In the modification Figs. 7 and 8 there is no perimetral shoulder 17S on the holder but the latter is formed with a circular rearwardly extending short collar 20 from which extends rearwardly a pair of diametrically opposite, parallel fingers 20F, each formed at its rear end with a small inwardly directed terminus 20T and both said fingers 20F so arranged that they may be slipped rearwardly upon the fixed sleeve 11 in its groove 14 then turned sidewise so that the termini 20T engage simultaneously in the forward part of side slot 14T. Subsequently the bulb stem is put in place and its pins 10P bear forwardly against the termini 20T to hold the holder 16 in place, spring 18 providing the pressure that causes forward friction action and holds the member 16.

Our headlight attachment in its preferred form and modification has now been fully disclosed. It might be stated that the web flange 16 need not necessarily be concave or convex but may be simply flat (not shown) but this and other modifications in details may be embodied within the scope and spirit of the invention.

We claim:

A headlight attachment for motor vehicle headlamps and the like having a central fixed electric contact sleeve with bayonet slots for removably retaining the stem of an electric bulb therein; said attachment comprising a circular disc member with concentric collar adapted to be removably retained on the exterior of said fixed contact sleeve, a pair of integral finger members extending rearwardly from said collar part and the rear extremity of each said finger formed with an inwardly directed short lip adapted to frictionally engage inwardly and forwardly in the inner terminus of one of said bayonet slots, and a light diffusing shield removably retained by said disc member concentric of and around an electric bulb retained in said sleeve, said shield comprising a cup like glass member, said disc being formed with forwardly directed fingers at its perimeter to removably and frictionally engage the perimetral opening of the shield to hold the latter in position, said shield provided further with a restricted opening normally forward of the bulb and said opening being of horizontally elongated shape.

PAUL W. HAMMERLE.
LOUIS MULLNER.